US010075757B2

(12) United States Patent
Ugan et al.

(10) Patent No.: US 10,075,757 B2
(45) Date of Patent: Sep. 11, 2018

(54) MULTI-SENSORY ENVIRONMENT ROOM

(71) Applicant: FOUNDATION PARTNERS GROUP, LLC, Orlando, FL (US)

(72) Inventors: David Ugan, Longwood, FL (US); E. Braiden Rex, Windermere, FL (US)

(73) Assignee: FOUNDATION PARTNERS GROUP, LLC, Orlando, FL (US)

( * ) Notice: Subject to any disclaimer, the term of this patent is extended or adjusted under 35 U.S.C. 154(b) by 124 days.

(21) Appl. No.: 14/491,381

(22) Filed: Sep. 19, 2014

(65) Prior Publication Data
US 2016/0088279 A1 Mar. 24, 2016

(51) Int. Cl.
*H04N 21/41* (2011.01)
*H04N 21/442* (2011.01)
(Continued)

(52) U.S. Cl.
CPC ......... *H04N 21/4307* (2013.01); *H04N 5/265* (2013.01); *H04N 5/272* (2013.01);
(Continued)

(58) Field of Classification Search
None
See application file for complete search history.

(56) References Cited

U.S. PATENT DOCUMENTS 5,734,590 A * 3/1998 Tebbe ..................... A61L 9/125
700/94
5,826,102 A * 10/1998 Escobar ............ G06F 17/30017
707/E17.009
(Continued)

FOREIGN PATENT DOCUMENTS

JP 8154808 6/1996
JP H08294444 11/1996
(Continued)

OTHER PUBLICATIONS

"Adaptive Remembering—Interactive Touchscreen and Software for the Funeral Experience—You Tube", http://www.adaptiveprojections.com; SEARCH-2-Innovate, LLC, Nov. 20, 2012, p. 21.

Primary Examiner — Ricky Chin
(74) Attorney, Agent, or Firm — Clark Hill PLC; John S. Paniaguas

(57) ABSTRACT

A system is disclosed that relates to a system for creating a multi-sensory environment room and more particularly to a system that enables the environment of a room to be selectively controlled to provide an integrated multi-sensory experience which includes video, sound and ambient scent technology which are all directed to a common theme which can be selectively customized. The multi-sensory environment room provides a calming and memorable setting that can showcase the decedent's life in a refreshing, upbeat setting. For example, a visual of waves crashing at the shore paired with the smell of fresh, salty air and the sounds of seagulls and surf of a special place shared with the decedent. Alternately, the environment can be personalized with sounds and scents that recreate the family memories or a patriotic theme that can highlight your loved one's values and devotion to country. A custom or stock video can be displayed using the 'picture within a picture' feature to customize the experience even more. The multi-sensory environment system overcomes formal stoic environment, for example, of a funeral home and lowers the anxiety of the decedent's family members and guests in attendance.

7 Claims, 10 Drawing Sheets

(51) Int. Cl.
*H04N 21/422* (2011.01)
*H04N 21/43* (2011.01)
*H04N 21/431* (2011.01)
*H04N 5/265* (2006.01)
*H04N 5/272* (2006.01)
*H04N 9/74* (2006.01)
*H04N 9/87* (2006.01)
*H04R 27/00* (2006.01)
*H04N 5/76* (2006.01)
*H04R 1/02* (2006.01)

(52) U.S. Cl.
CPC ............. *H04N 9/74* (2013.01); *H04N 9/8715* (2013.01); *H04N 21/4131* (2013.01); *H04N 21/42203* (2013.01); *H04N 21/4312* (2013.01); *H04N 21/44218* (2013.01); *H04N 5/76* (2013.01); *H04R 1/028* (2013.01); *H04R 27/00* (2013.01); *H04R 2227/005* (2013.01)

(56) References Cited

U.S. PATENT DOCUMENTS

| | | | | |
|---|---|---|---|---|
| 5,964,064 A * | 10/1999 | Goddard | ................ | A63J 5/021 352/43 |
| 6,076,638 A * | 6/2000 | Gertz | ................. | B66B 3/00 187/414 |
| 6,324,736 B1 * | 12/2001 | Atrio | ................. | A61G 17/04 27/14 |
| 6,681,534 B2 | 1/2004 | David et al. | | |
| 6,714,327 B1 * | 3/2004 | Abersfelder | ............ | B60K 35/00 345/9 |
| 6,804,406 B1 * | 10/2004 | Chen | ................. | G06T 3/4038 345/1.3 |
| 8,905,610 B2 * | 12/2014 | Coleman | ............. | G02B 6/0018 362/554 |
| 2002/0114744 A1 * | 8/2002 | Chiao | .................... | A61L 9/014 422/124 |
| 2002/0135739 A1 * | 9/2002 | Standard | .................. | E04H 3/22 353/46 |
| 2003/0164557 A1 * | 9/2003 | Chung | .................. | A61L 9/035 261/26 |
| 2003/0214574 A1 | 11/2003 | Saruhashi | | |
| 2004/0015983 A1 * | 1/2004 | Lemmons | ............... | H04N 5/44 725/12 |
| 2005/0068595 A1 | 3/2005 | Fitzgerald | | |
| 2005/0075896 A1 * | 4/2005 | Dodgen | ................. | G06Q 30/02 715/730 |
| 2005/0206751 A1 * | 9/2005 | Manico | ................ | G11B 27/034 348/239 |
| 2005/0270497 A1 * | 12/2005 | Kepley, Jr. | ............. | G03B 23/08 353/79 |
| 2007/0024826 A1 * | 2/2007 | Gilbert | ................... | G03B 21/26 353/122 |
| 2007/0040898 A1 * | 2/2007 | Lee | ....................... | H04N 7/147 348/14.08 |
| 2007/0103652 A1 * | 5/2007 | Nijim | .................... | G03B 37/04 353/94 |
| 2008/0082311 A1 * | 4/2008 | Meijer | ................... | G06F 3/011 703/24 |
| 2008/0263620 A1 * | 10/2008 | Berkvens | ............... | H04N 7/163 725/136 |
| 2009/0172022 A1 * | 7/2009 | Bathiche | ............. | G06F 17/2229 |
| 2010/0013738 A1 * | 1/2010 | Covannon | .......... | H04N 5/23203 345/1.3 |
| 2011/0040804 A1 * | 2/2011 | Peirce | ............... | G06F 17/30056 707/803 |
| 2011/0075101 A1 * | 3/2011 | Sato | ....................... | G03B 37/04 353/30 |
| 2012/0038823 A1 * | 2/2012 | Chien | .................... | G09G 3/003 348/469 |
| 2013/0046642 A1 * | 2/2013 | Jacobus | ................. | G06Q 50/12 705/15 |
| 2014/0146080 A1 | 5/2014 | Ivashin et al. | | |
| 2014/0176664 A1 * | 6/2014 | Wu | ........................ | H04N 7/15 348/14.07 |
| 2016/0088279 A1 * | 3/2016 | Ugan | ..................... | H04N 5/265 386/248 |
| 2016/0292821 A1 * | 10/2016 | Cho | ...................... | G06T 3/4038 |

FOREIGN PATENT DOCUMENTS

| | | |
|---|---|---|
| JP | H10243871 | 9/1998 |
| JP | 2002203253 | 7/2002 |
| JP | 2011161088 | 8/2011 |
| KR | 20010074209 | 8/2001 |
| KR | 20050045303 | 5/2005 |
| KR | 20060082940 | 7/2006 |
| KR | 20090003514 | 1/2009 |
| KR | 20090093315 | 9/2009 |

* cited by examiner

MULTI-SENSORY ENVIRONMENT ROOM

BACKGROUND OF THE INVENTION

1. Field of the Invention

The present invention relates to a multi-sensory environment room and more particularly to a system that enables the environment of a room to be selectively controlled to provide an integrated multi-sensory experience which includes video, sound and ambient scent technology which are all directed to a common theme.

2. Description of the Prior Art

Various systems are known for providing sensory effects in a room. These systems are primarily directed to systems which provide visual effects in a funeral parlor. Several different types of systems are known.

The following systems are for providing visual effects in which one or more video images, primarily of a decedent, are displayed in a funeral parlor. Examples of these systems are disclosed in Japanese Patent Publication JP8154808 A2; Japanese Patent Publication JPH10243871; Japanese Patent Publication JP2011161088A2; Korean Patent Publication KR20010074209; Korean Patent Publication KR20050045303A; Korean Patent Publication KR20060082940A; Korean Patent Publication KR20090003514A. Adaptive Technologies (https/www.y-outube.com/watch?v=zWIyD5yzA2U) discloses an interactive touchscreen for displaying pictures associated with the decedent's life.

The following systems are for providing visual and sound effects in a funeral parlor. Japanese Patent Publication JP2002203253 A2 and US Patent Application Publication No. US 2005/0075896 A disclose a system for providing visual and sound effects. The visual and sound effects are prerecorded by the person before their funeral and played at the person's wake in the funeral parlor.

The above systems do little to change the overly formal stoic environment of a funeral home which can cause anxiety in the family members of the decedent as well as guests.

Thus, there is a need for a change in the stoic environment of a funeral home in order to lower anxiety and to provide the opportunity to celebrate one's life.

SUMMARY OF THE INVENTION

Briefly, the present invention relates to a system for creating a multi-sensory environment room and more particularly to a system that enables the environment of a room to be selectively controlled to provide an integrated multi-sensory experience which includes multiple sensory generators including video, sound and ambient scent generators which are all directed to a common theme which can be selectively customized. The experience can also be augmented by displaying a custom memorial video within the playing theme. This memorial video can be a custom created set of images/videos of the family or it could be a separate set of images/videos selected by the family. Picture in a picture (PIP) technology can be used to enhance the video display and has the capability of personalizing the chosen theme down to the specific family. In particular, the picture (PIP) feature can be used to add a personalized memorial video. As such, the multi-sensory environment room can be used to provide a calming and memorable setting that can showcase the decedent's life in a refreshing, upbeat setting. For example, a visual of waves crashing at the shore paired with the smell of fresh, salty air and the sounds of seagulls and surf of a special place shared with the decedent. Alternately, the environment can be personalized with sounds and scents that recreate the family memories or a patriotic theme that can highlight a loved one's values and devotion to country. The multi-sensory environment system overcomes formal stoic environment of a funeral home and lowers the anxiety of the decedent's family members and guests in attendance.

DESCRIPTION OF THE DRAWING

These and other advantages of the present invention will be readily understood with reference to the following specification and attached drawing wherein:

FIG. 5 is an exemplary web page generated by the controller after the projectors have been turned on.

DETAILED DESCRIPTION

The present invention relates a system for creating a multi-sensory environment room and more particularly to a system that enables the environment of a room to be selectively controlled to provide an integrated multi-sensory experience which includes multiple sensory generators including video, sound, ambient sensory generators and may include Picture in Picture (PIP) technology that can be used to add a personalized memorial video to a video being displayed on a large screen all of which are all directed to a common theme and which can be selectively customized. The multi-sensory environment room provides a calming and memorable setting that can showcase the decedent's life in a refreshing, upbeat setting. For example, a visual of waves crashing at the shore paired with the smell of fresh, salty air and the sounds of seagulls and surf of a special place shared with the decedent. Alternately, the environment can be personalized with sounds and scents that recreate the family memories or a patriotic theme that can highlight your loved one's values and devotion to country. The multi-sensory environment system overcomes formal stoic environment of a funeral home and lowers the anxiety of the decedent's family members and guests in attendance.

Figure 1:
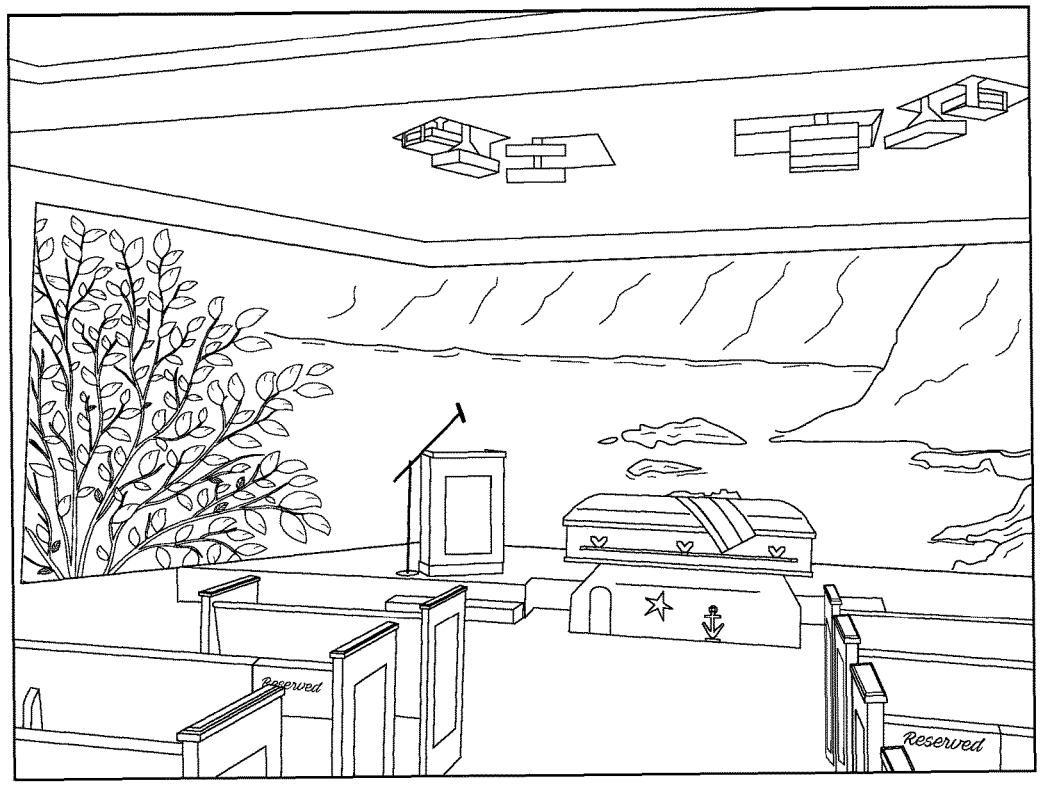
FIG. 1 illustrates an exemplary visual setting of an ocean with waves crashing against a shore that is produced by the present invention and supplemented with sound and aroma effects to create a multi-sensory environment in a room.
Figure 2:
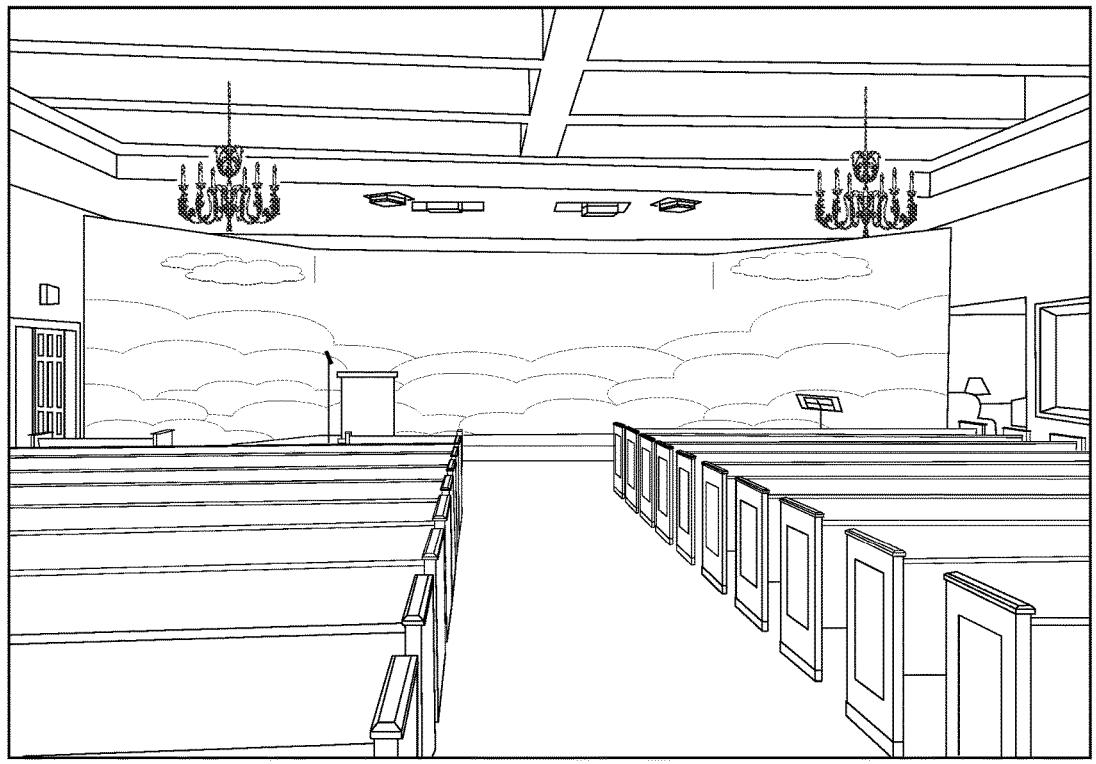
FIG. 2 illustrates another exemplary visual setting of clouds that is produced by the present invention and supplemented with sound and aroma effects to create a multi-sensory environment in a room.
Figure 2A:
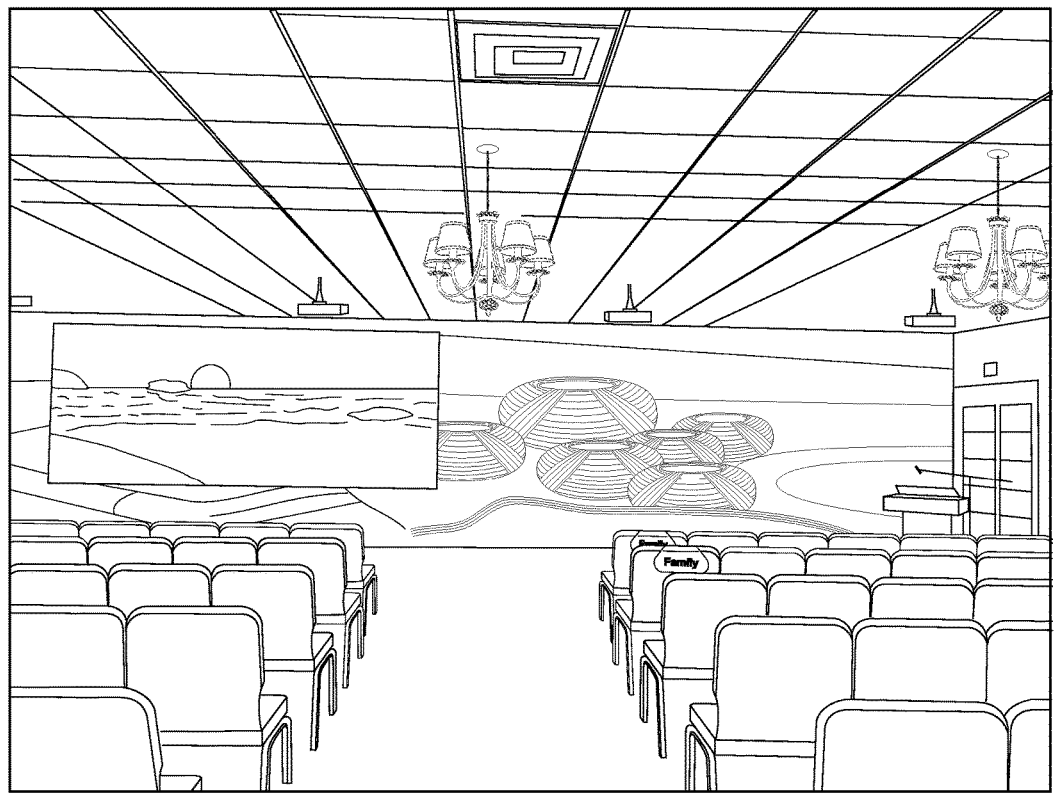
FIG. 2A illustrates the 'picture within a picture' feature of the system.

Referring to FIGS. 1 and 2, various exemplary visual effects are illustrated which relate to environmental backgrounds. These environmental backgrounds relate to backgrounds occurring naturally. These environmental backgrounds may be supplemented by sound and aroma effects to create multi-sensory environments in an indoor area, such as a room or a funeral parlor. Each multi-sensory environment is based upon a common theme. FIG. 2A illustrates a Picture in Picture feature that can be used to enhance the video effect.

For example, FIG. 1 illustrates an environmental background depicted as an ocean scene. In the ocean theme, the visual effects are represented as the waves in an ocean splashing up on shore. The sound effects may include the sound of seagulls while the aroma effects may be an aroma of fresh salty air. All three of the sensory effects; namely, visual sound and aroma are related to a common theme. In this case, the common theme is the ocean. Other themes are possible.

The themes may optionally include a visual effect which may include the decedent while alive involved in an event, such as an event in military service or building a sandcastle with grandchildren with corroborating sound and aroma effects to create personalized multi-sensory environments. This type of environment is classified as an event background. Other types of backgrounds include scenic events, such as a golf course, as well as backgrounds depicting highlights from sports events, favorite destinations, and the like. All such multi-sensory environments are considered to be within the broad scope of the invention.

In accordance with an important aspect of the system, all of the sensory generators, for example, the visual, sound and scent generators, discussed below, are all coordinated with a common theme. Both existing and customized themes are available, as discussed below.

Existing Themes

With this option, the customer chooses one of the existing ShareLife® 'Themes' exhibited in a ShareLife® Room. Exemplary existing themes are discussed below. All existing themes' include a pre-designated video, audio track and scent activated by the respective sensory generator.

As discussed below, the sensory generators can be launched from a tablet computer that activates the video, audio and scent sensory generators—note that the proper scent needs to be installed in the scent machine.

Once the room is activated with the 'Theme', the room can be controlled to accommodate the particular needs of the service.

The 'Theme' track or music volume can be adjusted or turned off.
The scent generator can be turned on or off.
One or more of the microphones can be used—volumes are adjustable.
Organs, electric pianos or other audio inputs could be added.
The tribute DVD can be activated then shut off.
The family, accompanist or soloist's music and volume can be adjusted.

After the service is over the room can be shut down by turning off each of the inputs OR by selecting the 'OFF' button.

Customized Themes

With this option, any of the room's features are individually controlled to follow a unique script created for the service. Note that the proper scent needs to be loaded into the scent generator. This scenario gives maximum flexibility for the service but requires close coordination in operating the features of the room to follow the script. The controlled features are:

Select any background
Play tracks off of the CD player
Play the memorial DVD
Select one or two microphones to use in service
Adjust volumes on microphones, CD player, DVD player, organ or theme
Turn on, turn off scent machine—arranger needs to make sure the proper scent is in place A simpler version of this customized theme service is a 'Set a Background' or 'Stateroom' scenario. Here the arranger selects a background and music. Once these are selected the volume of the music can be adjusted. The room is turned off when the service is complete.

Customer Supplied Music: If a customer brings in their own music, it's important to note that music provided on a CD format has the capabilities to be controlled from a remote tablet, as discussed below. If the music is on a device (iPod or MP3 player), playing the music will require someone to be next to the control panel and press 'play' on the device to start the music. From here, microphones and volumes can be selected and adjusted.

Exemplary Existing Life Story Themes

The following themes are merely exemplary. Additional themes are contemplated.

Galactic Journey of a Lifetime

Potential Audience: Anyone fascinated by outer space or gazing into the nighttime sky; an explorer who traveled to new places and worlds; someone who worked in or loved the space industry Description: Guests enter the ShareLife® Room seeing an interplanetary projection/traveling through space theme. The scent component is a metallic smell simulating the inside of a space capsule. In the background, there are beeps and clicks like you would hear "on-board." The celebrant is dressed in an astronaut jumpsuit and describes the deceased's journey from the viewpoint of being a crew member with him/her. Scenes from the space program, such as Apollo/Space Shuttle launches, Neil Armstrong walking on the moon, astronauts in zero g in the shuttle, and spacewalks are projected on the screen during the description. The Life Tribute video has a space backdrop.

A Life of Adventure

Potential Audience: An extensive traveler; someone who studied world affairs or speaks multiple languages; a person who had a favorite international destination.

Description: Guests enter the ShareLife® Room seeing projections of various international cities and landmarks (London, Paris, Rome, Taj Mahal, Tokyo, Great Wall, etc.). Airport/cruise ship pictures could also be appropriate. Scent could be salt air (cruise) or exotic spice. Celebrant is dressed in a safari jacket and describes deceased as a journeyer/explorer. The Life Tribute video has an international landmarks theme.

A Life on Tour

Potential Audience: Music buffs; musicians/performers

Description: Guests enter the ShareLife® Room seeing projections of famous rock 'n roll groups. Soundtrack has clips of different rock and roll songs. Scent is incense. Celebrant dressed as a musician and describes deceased as part of the band. Life Tribute video has instrument/musician backdrops.

Life is in the Ride, not the Destination

Potential Audience: motorcycle buffs

Description: Guests enter the ShareLife® Room seeing projections of bikers on a long ride through different terrains/scenery with Harley exhaust soundtrack. Scent is leather or outdoor smells. Celebrant dressed in leather biker attire and describes the deceased as a fellow rider. Life Tribute video has biker backdrops.

A Life of Honor

Potential Audience: Veterans

Description: Guests enter the ShareLife® Room seeing projections of famous military scenes/landmarks (Normandy, Iwo Jima, aircraft carrier takeoffs, ships refueling at sea, sub surfacing, Arlington 21-gun salute, etc). Scent is gunpowder. Celebrant dressed in uniform (may need different uniforms for different services) and talks about deceased as being together "in the battle." Tribute video has military backdrops. Patriotic music or armed forces themes can be played as a soundtrack.

A Life of Service

Similar to "A Life of Honor" but for first responders.

Fairways of Life

Potential Audience: Golfers, Golf fans

Description: Guests enter ShareLife® Room seeing projections of famous golf scenes and golf holes. Scent is cut grass and possibly salt air. In the background, golfers can be heard "teeing off" and "putting". Celebrant dressed as golfer talks about the deceased in terms of the stories told while playing a round of golf together. Tribute video has golf backdrops.

Nature's Beauty

Potential Audience: Hikers, outdoorspeople, environmentalists

Description: Guests enter ShareLife® Room seeing projections of beautiful nature scenes (mountains, waterfalls, forests, lakes, etc.). Scent is forest air (wood, pine). In the background, birds chirping, water flowing and other nature noises can be heard.

Life Blooms Eternally

Potential Audience: Gardeners

Description: Guests enter ShareLife® Room seeing projections of beautiful gardens and wild flowers. Scent is floral. Background audio is birds chirping, grasshoppers, etc. Celebrant dressed as gardener and talks about all the "planting and nurturing" done by deceased (family, work, community, etc.). Life Tribute video has flower/garden scene backdrops.

Waves of Life

Potential Audience: People who love the beach; scuba divers; watersports fans

Description: Guests enter ShareLife® Room seeing projections that start at the beach. Through the service, the scene changes to underwater with colorful fish darting by. Scent is salt air. Celebrant dressed in Hawaiian shirt talks about walking on the beach and talking about the life story. The Life Tribute video has beach scenes backdrops.

A Life in his Hand

Potential Audience: Spiritual/church focused people

Description: Guests enter ShareLife® Room seeing projections of beautiful churches (e.g., Notre Dame), Holy Land scenes, Vatican, Bible images. Gregorian chant sound track. Scent is spice or incense. Celebrant dressed in white garments similar to Biblical times and talks about journeying together with the deceased. Life Tribute video has religious symbols/backdrops.

A Love of the Game

Potential Audience: Fan of a sports team

Description: Guests enter ShareLife® Room seeing projections of highlights from particular sport (e.g., college basketball, NBA, college football, NFL, etc.). Scent is popcorn and beer. Background audio includes crowd noise, whistles, and cheers. Celebrant dressed as referee and talks about how the deceased played the game of life. The Life Tribute video may have sports backdrops.

ShareLife® Room (Multi-sensory Experience)

The ShareLife® Room provides video, audio and scent elements to create a flexible backdrop of different locations that assist in telling the life story of a deceased. The ShareLife® Room uses elements such as projectors and screens and/or LED walls, a scent generator, video and audio footage, props and costumed narrators to create the environment.

Different themes may include, but are not limited to:
Beach/ocean
Golf course
Nature/gardens/forest
Motorcycle trip
Outer space
Music concert
World travel
Sports event
Church/holy sites
Military sites
First responder The ShareLife® Room can be any indoor environment. For example, the Life Story Room can be a funeral parlor or other indoor environment.

Figure 3A:
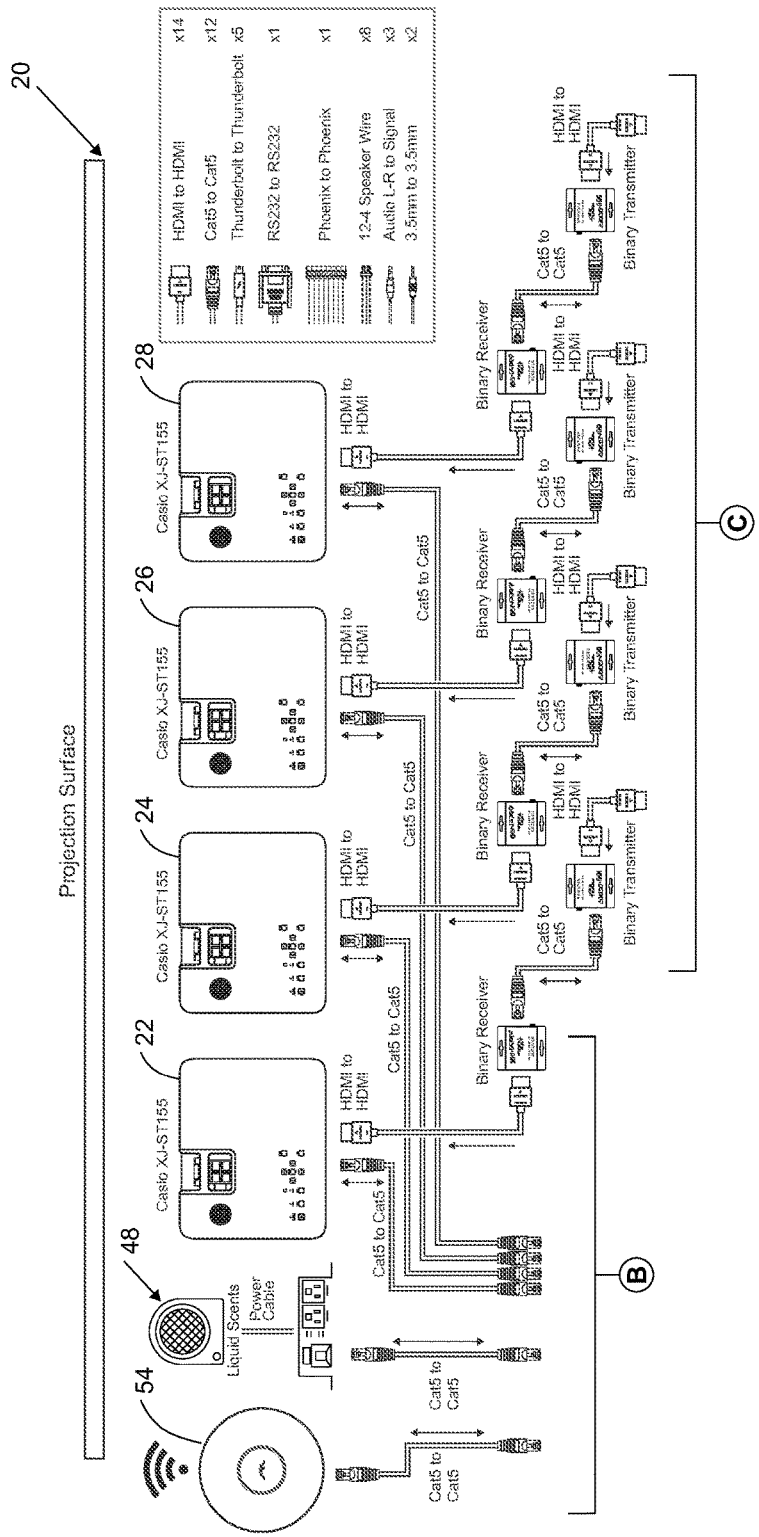
FIG. 3 is an exemplary hardware flow diagram of a system for creating a multi-sensory environment in a room.
Figure 3B:
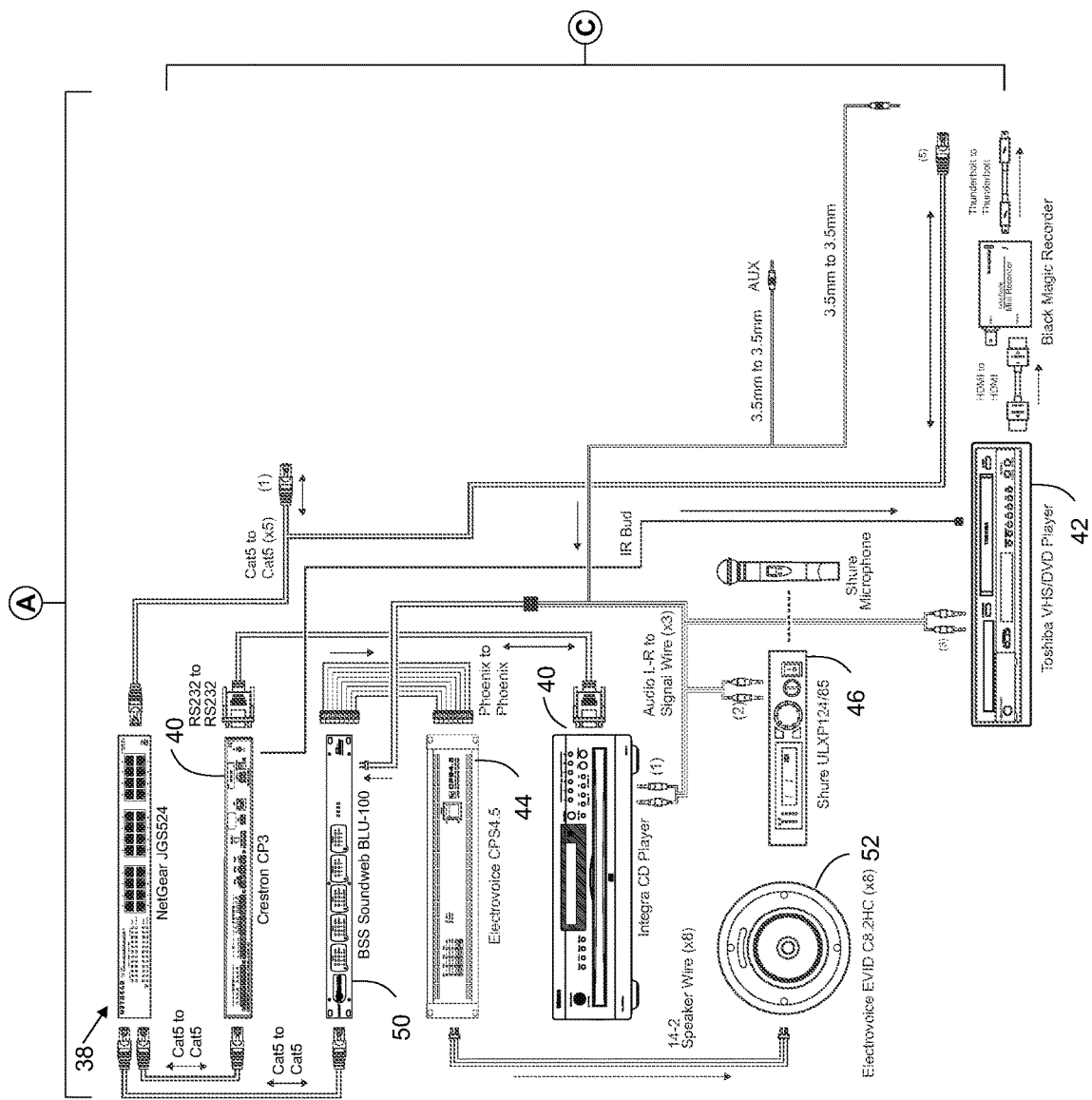
Figure 3C:
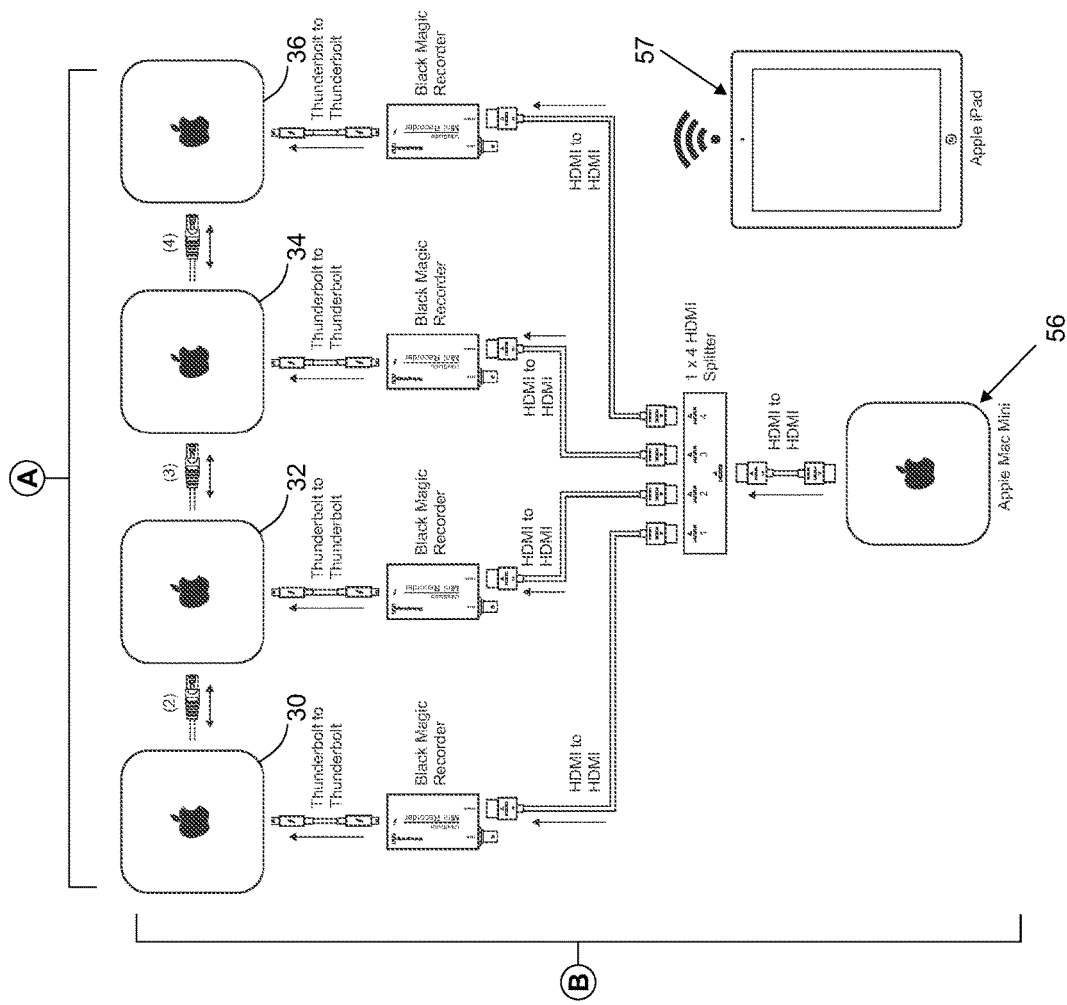

FIG. 3 illustrates an exemplary hardware flow diagram for creating the multi-sensory environments. The system, generally identified with the reference numeral 20, includes a plurality of visual sensory generators, for example, video projectors. Four are illustrated in FIG. 3 and identified with the reference numerals. The projectors 22, 24, 26 and 28 may be ceiling mounted, for example as illustrated in FIGS. 1 and 2. Suitable projectors are Casio Model XJ-ST155-3000 Lumens XGA (1024×768) Short throw Laser/LED Hybrid projectors. Each projector 22, 24, 26 and 28 projects a video image 9' high by 46" wide. The four projectors 22, 24, 26 and 28 together project a panoramic image that is 9" high and 15' wide onto a 10'×15' edgeless projector screen.

Each of the projectors 22, 24, 26 and 28 is connected to a PC 30, 32, 34 and 36, respectively, for example, Mac Mini PCs. The projectors 22, 24, 26 and 28 are also connected to a network switch 38, for example, a NetGear Model JGS524, ProSafe 24 port Gigabit switch. The network switch 38 is connected to a controller 40, for example a Crestron CP3. The controller 40 controls virtually all of the audio visual equipment in the system 20. For example, the system 20 includes a CD player 40, a DVD player 42, an amplifier 44, a microphone system 46 and a scent system 48. All controlled by the controller 40. All audio input from the DVD 42, CD player 41 and the microphone system 46 are processed by an audio controller which may include a digital signal processor, for example a BSS Soundweb BLU-100, which functions as one of the sensory generators and controls all of the audio inputs and directs the audio inputs to the amplifier 40, for example, an Electro Voice .model CPS4.5, which drives the speaker 52.

The controller 40 also controls a wireless router 54 and a sensory generator 48, such as a scent generator, for example, a Scent Air Industrial Scent Machine. The wireless router 54 allows the system to be controlled wirelessly, for example, from a wireless tablet 56.

Essentially, the controller 40 controls all devices connected to it and to the digital switch 38. The controller 40 may be controlled externally by a Crestron Mobile Pro application on the iPad tablet 56. The application as well as the programming of the application is described at http://www.crestron.com/resources/product_and_programming_resources/catalogs_and_brochures/onlinecatalog/default.asp?jump=1&model=CRESTRON-MOBILE-PRO, hereby incorporated by reference. The operation of the Crestron app is described below.

Operation of Controller 40

Figure 4:
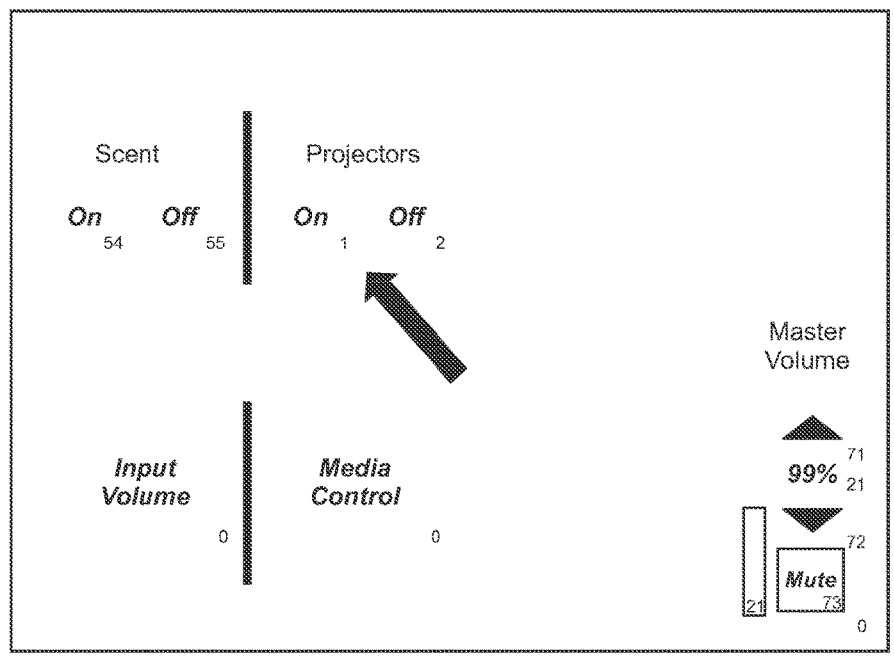
FIG. 4 is an exemplary web page illustrating the control of the sensory controller.
Figure 5:
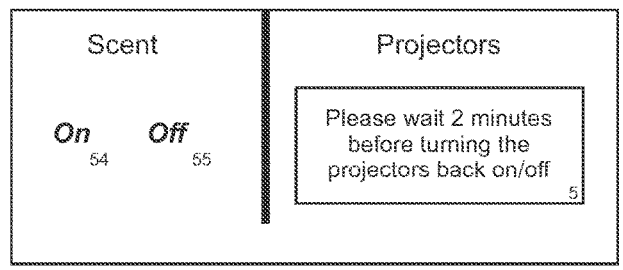
Figure 6:
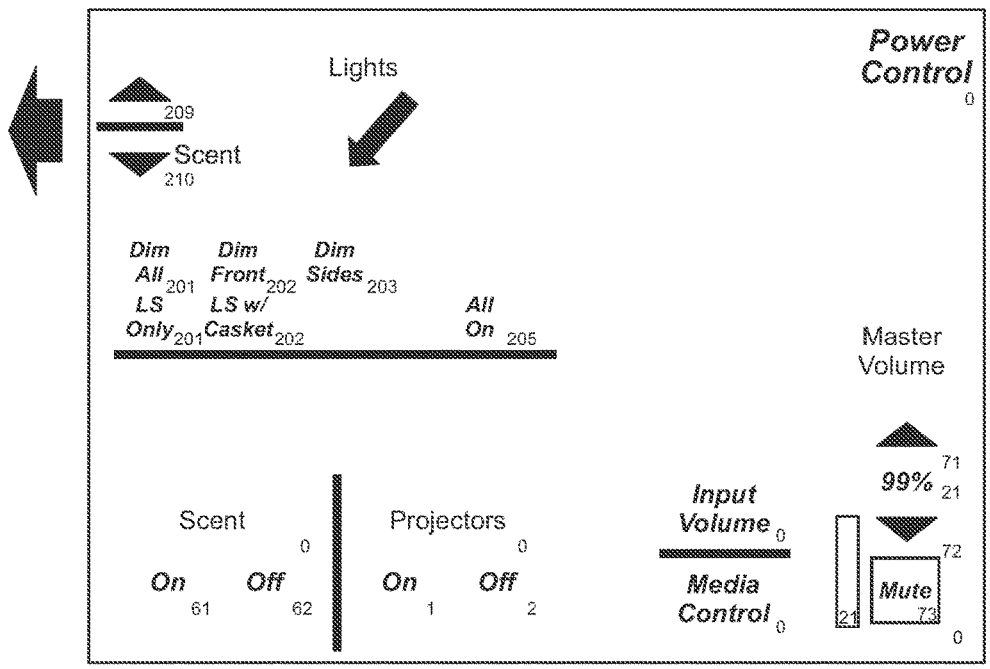
FIG. 6 is an exemplary web page illustrating the lighting control of the sensory controller.
Figure 7:
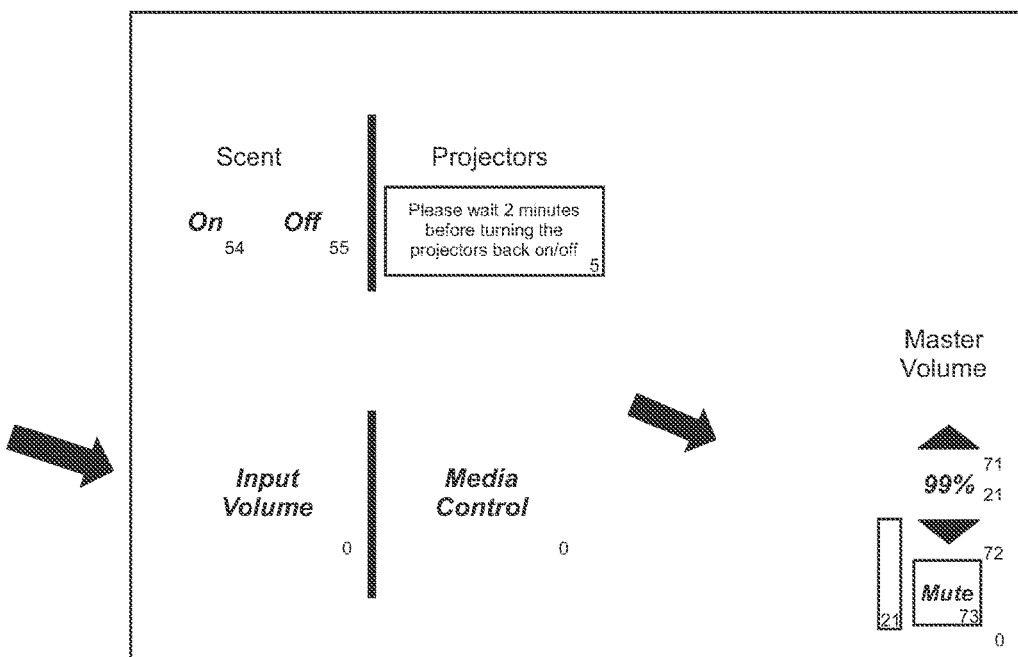
FIGS. 7 and 8 are exemplary web pages illustrating the audio control of the sensory controller.
Figure 8:
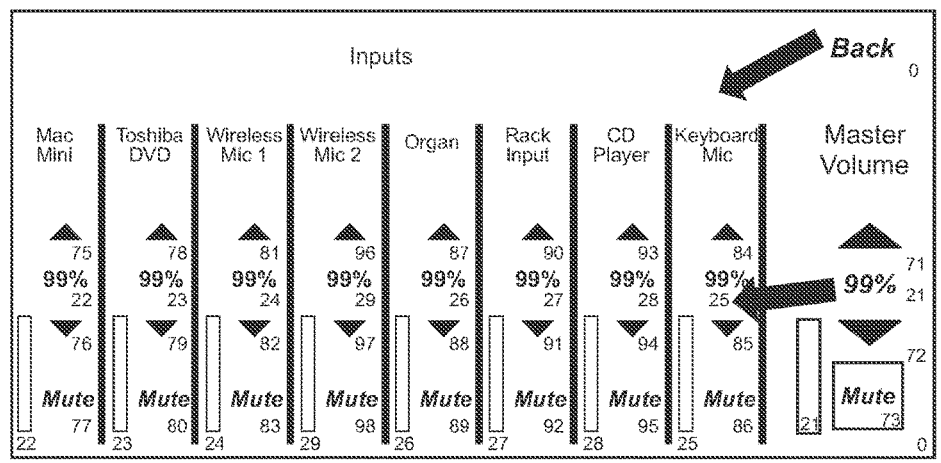
Figure 9:
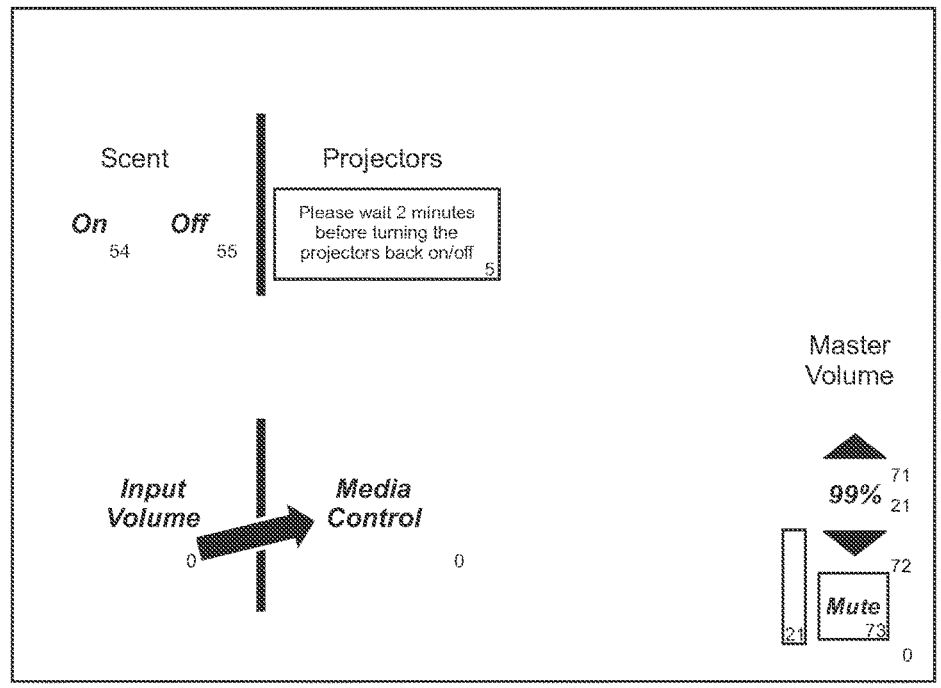
FIGS. 9 and 10 are exemplary web pages illustrating the audio control of the sensory controller.
Figure 10:
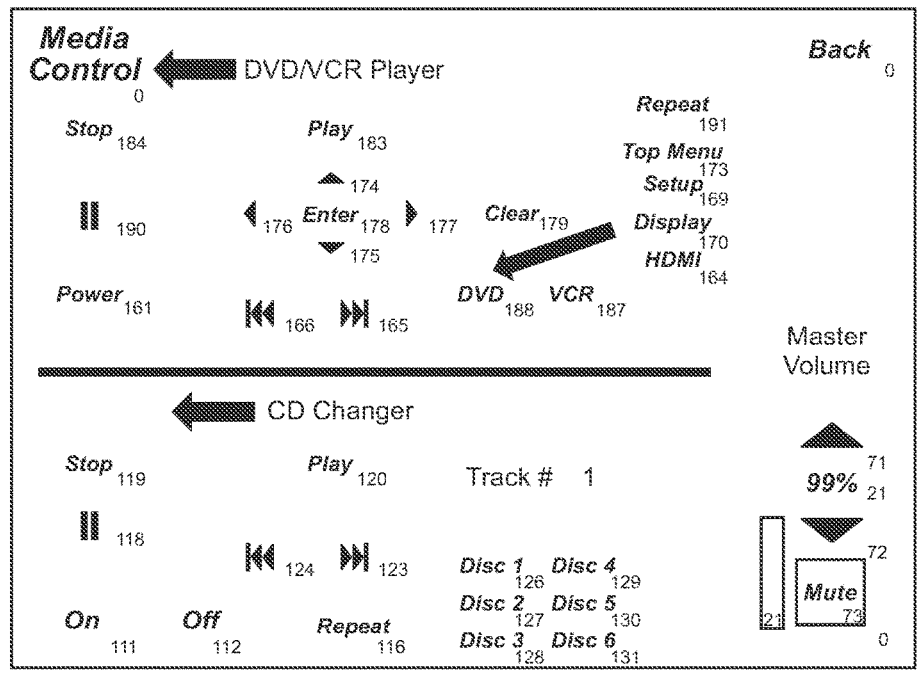
Figure 11:
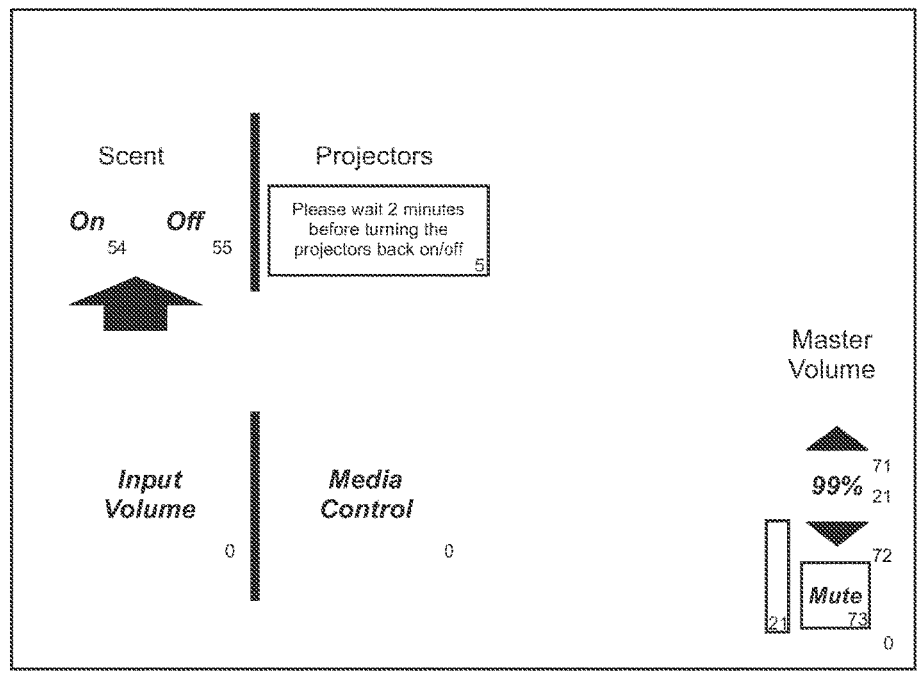
FIG. 11 is an exemplary web page illustrating the scent control of the sensory controller.

Turning the System ON:
Once the Crestron Mobile G app has opened you will be directed to the Power Control page (FIG. 4)
This page will allow you to control power to the projectors and scent machine
*Note* system will always be on. The only thing that is being turned on or off are the projectors and the scent machine
elect Projectors—On to turn all projectors on, as shown in FIG. 4.
*Note* A grey block will pop up for 2 minutes to prevent user from powering on and off to protect the projectors during warm up/cool down period, as illustrated in FIG. 5.
Lighting Control:
The Main page (FIG. 6) contains control for room lighting
Use the up/down arrows to control light dimming
Use the All On button to turn all the lights on
The other buttons contain lighting presets
Audio Control:
Audio control allows a user to control all audio input devices (See FIG. 7)
Master Volume controls the overall output volume.
Select input Volume to go to the individual input volume control
*Note* the Input Volume page (FIG. 8) will allow you to mute and unmute selected audio input devices
Mac Mini—controls audio out of the mac mini that powers the projectors. This also controls any audio associated with a theme.
Toshiba DVD—controls volume from the DVD/VCR player
Wireless Mic 1—controls Microphone volume for wireless microphone 1
Wireless Mic 2—controls Microphone volume for wireless microphone 2
Organ—controls the volume of the Keyboard
Rack Input—controls extra audio input located in the AV rack. This would be for any mobile devices that are being used in a service.
CD player—controls volume of the CD player
Keyboard Mic—controls microphone input on wall plate next to the Keyboard
You have the option to either raise, lower, or mute any inputs
You also have the same Master Volume control on this page
*Note* If you have no audio on an input even though the input volume is up, check the master volume since that adjusts the overall volume being outputted to your speakers.
To return to the Power Control page select Back
Media Control:
The Media Control page is used to control select input devices
On the main Power Control page (FIG. 9), select Media Control located adjacent Input Volume
Once the Media Control page (FIG. 10) is displayed you will notice that you have the option to control either the DVD/VCR player or the CD changer
The controls for the DVD/VCR player and the CD player are set to mimic the devices remote control
The CD Changer portion will display current track #. For the current disc, the "Disc 1-6" buttons will be highlighted if ONLY you change the disc from the iPad. The disk numbers will be out of sync if the CDs in the CD Changer play continuously without intervention. To get the correct disk playing, tap the disk that needs to be played.
*Note* "HDMI" controls the output video resolution. It should always be set at 480p. This button is used to change resolution in the instance that it is not on 480p.
Select Back to return to the main Power Control page
Scent Machine Control:
The scent machine can be turned On and Off from the Power Control page (FIG. 11)
The scent machine uses internal timing to release scent, therefore it is not necessary to turn the scent machine on and off during the course of a service.
When the service has concluded select Off to turn the scent machine off
The main server 56 controls the images displayed by the projectors 22, 24, 26 and 28. Specifically the server 56, for example, a Mac Mini, controls the splitting of the video image into four component parts with each component part of the video image being fed to a different projector 22, 24, 26 and 28 to create a seamless panoramic view. The video images can be static or dynamic images. The server 56 also controls blending the images so that the resulting image on the 10'×15' foot screen is a seamless composite image. Such video processing is known in the art, for example, as disclosed in US Patent Application Publication No. 2014/0146080 A1, hereby incorporated by reference.

Picture in Picture (PIP) video processing, for example, as illustrated in FIG. 2A, is also known in the art. An example of a PIP system is disclosed in US Patent Application Publication No. 2013/0005457 A1. Assuming the PIP is selectively displayed by one of the four projectors 22, 24, 26 and 28, the composite video signal directed to that projector 22, 24, 26 may be further processed to provide the PIP feature, for example, as taught by the '457 publication, hereby incorporated by reference.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A system for creating a plurality of custom multi-sensory themes in an environmental room based on user-selectable multi-sensory stimulus, the system comprising:
    at least one video generator for generating a plurality of different user selectable video signals depicting different environmental backgrounds;
    a plurality of projectors for projecting video image components;
    a projector screen for displaying said video image components;
    a computer system for splitting user-selected video signals from said video generator into video image components and feeding each of said video image components to a separate one of said plurality of projectors to create a seamless panoramic image on said projector screen of said selected environmental background;
    one or more additional sensory generators including a sound generator and a scent generator for generating additional sensory stimulus that relate to said selected environmental background;
    a controller for enabling selective and individual control of a plurality of sensory devices including a CD player, a DVD player, an amplifier, a microphone and a scent generator to enable a user to select one of a plurality of environmental backgrounds and control said projectors to display said selected environmental background and individually activate one or more additional sensory devices to create a user customizable multi-sensory environment from a plurality of user-selectable multi-sensory themes; and a wireless user interface for selectively enabling a user to control said controller in real time.

2. The system as recited in claim 1 wherein said video generator is configured with picture in picture technology.

3. The system as recited in claim 1, wherein said environmental background is a scenic background.

4. The system as recited in claim 3, wherein said environmental background is an event.

5. The system as recited in claim 3, wherein said environmental background is a scenic background.

6. The system as recited in claim 3, wherein said environmental background is a background of a favorite destination.

7. The system as recited in claim 1, further including a router under the control of said controller for enabling said controller to be controlled wirelessly.

\* \* \* \* \*